(12) United States Patent
Baruzzini et al.

(10) Patent No.: US 10,794,329 B2
(45) Date of Patent: Oct. 6, 2020

(54) EXHAUST PLUME COOLING USING PERIODIC INTERRUPTION OF EXHAUST GAS FLOW TO FORM AMBIENT AIR ENTRAINING VORTICES

(71) Applicant: Lockheed Martin Corporation, Bethesda, MD (US)

(72) Inventors: Dan J. Baruzzini, Keller, TX (US); Neal David Domel, Fort Worth, TX (US); Daniel N. Miller, Bainbridge Island, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 746 days.

(21) Appl. No.: 15/366,876

(22) Filed: Dec. 1, 2016

(65) Prior Publication Data

US 2017/0096965 A1    Apr. 6, 2017

Related U.S. Application Data

(62) Division of application No. 14/092,147, filed on Nov. 27, 2013, now Pat. No. 9,541,030.

(51) Int. Cl.
| | |
|---|---|
| *F02K 1/82* | (2006.01) |
| *F01D 25/30* | (2006.01) |
| *F02K 1/38* | (2006.01) |
| *F02K 1/46* | (2006.01) |
| *F02K 1/28* | (2006.01) |
| *B64D 33/04* | (2006.01) |
| *F02C 7/12* | (2006.01) |
| *B64D 41/00* | (2006.01) |

(52) U.S. Cl.
CPC .............. *F02K 1/822* (2013.01); *B64D 33/04* (2013.01); *B64D 41/00* (2013.01); *F01D 25/30* (2013.01); *F02K 1/28* (2013.01); *F02K 1/386* (2013.01); *F02K 1/46* (2013.01); *B64D 2041/002* (2013.01); *F02C 7/12* (2013.01); *F05D 2220/50* (2013.01); *Y02T 50/675* (2013.01)

(58) Field of Classification Search
CPC .......... F01D 25/30; F01D 25/305; F02C 7/12; F02K 1/28; F02K 1/46; F02K 9/82; F02K 1/38–386; F02K 1/822; F02K 1/386; Y02T 50/675; B64D 33/04; B64D 41/00; B64D 2041/002; F05D 2220/50
See application file for complete search history.

(56) References Cited

U.S. PATENT DOCUMENTS

| | | | | |
|---|---|---|---|---|
| 2,763,984 A | * | 9/1956 | Marchal | F02K 1/30 239/265.17 |
| 3,212,259 A | * | 10/1965 | Kepler | F02K 9/82 60/231 |
| 3,626,698 A | * | 12/1971 | Baum | F02K 7/18 60/768 |
| 3,682,269 A | * | 8/1972 | Jumelle | F02K 1/34 181/219 |

(Continued)

*Primary Examiner* — Alain Chau
(74) *Attorney, Agent, or Firm* — Reising Ethington P.C.

(57) ABSTRACT

An exhaust plume cooling device for cooling an exhaust gas plume to reduce deleterious heat effects on impinged and surrounding surfaces. The device is supportable in a position downstream of an exhaust nozzle of an exhaust gas plume-producing engine and configured to periodically interrupt the flow of exhaust gases by injecting fluid into the exhaust plume zone.

7 Claims, 7 Drawing Sheets

(56) References Cited

U.S. PATENT DOCUMENTS

| | | | | |
|---|---|---|---|---|
| 3,830,431 A * | 8/1974 | Schwartz | F02K 1/383 | 239/265.11 |
| 4,131,432 A * | 12/1978 | Sato | B01D 53/8625 | 422/177 |
| 6,092,360 A * | 7/2000 | Hoag | B64D 33/08 | 244/58 |
| 6,112,512 A * | 9/2000 | Miller | F02K 1/30 | 239/265.17 |
| 6,112,513 A * | 9/2000 | Catt | F02K 1/30 | 239/265.17 |
| 6,308,740 B1 * | 10/2001 | Smith | F02C 7/04 | 137/892 |
| 6,308,898 B1 * | 10/2001 | Dorris, III | F02K 1/34 | 239/265.17 |
| 6,651,929 B2 * | 11/2003 | Dionne | B64D 33/08 | 244/57 |
| 6,896,475 B2 * | 5/2005 | Graziosi | F01D 25/305 | 415/1 |
| 6,942,181 B2 * | 9/2005 | Dionne | B64D 33/08 | 244/57 |
| 7,055,329 B2 * | 6/2006 | Martens | F02K 1/38 | 60/772 |
| 7,337,605 B2 * | 3/2008 | Hagshenas | B64D 33/08 | 244/58 |
| 7,364,117 B2 * | 4/2008 | Dionne | B64D 33/08 | 244/58 |
| 7,950,218 B2 * | 5/2011 | Beutin | F01D 9/065 | 60/231 |
| 8,316,631 B2 | 11/2012 | Miller et al. | | |
| 8,820,084 B2 * | 9/2014 | Smith | F02K 1/28 | 415/914 |
| 2005/0091963 A1 | 5/2005 | Li | | |
| 2006/0283188 A1 * | 12/2006 | Webster | F02K 1/34 | 60/770 |
| 2012/0079803 A1 * | 4/2012 | Miller | F02K 1/30 | 60/205 |
| 2013/0133857 A1 | 5/2013 | Miller et al. | | |

* cited by examiner

EXHAUST PLUME COOLING USING PERIODIC INTERRUPTION OF EXHAUST GAS FLOW TO FORM AMBIENT AIR ENTRAINING VORTICES

CROSS-REFERENCES TO RELATED APPLICATIONS

This is a U.S. divisional patent application which claims the benefit of U.S. Non-Provisional Application Ser. No. 14/092,147, filed on Nov. 27, 2013, the entire contents of which are incorporated herein by reference.

STATEMENT REGARDING FEDERALLY SPONSORED RESEARCH OR DEVELOPMENT

Not Applicable

BACKGROUND

Field

This application relates generally to the cooling of an exhaust gas plume to reduce deleterious heat effects on impinged and surrounding surfaces.

Description of Related Art Including Information Disclosed Under 37 CFR 1.97 and 1.98

Hot exhaust gases from power generators, such as gas turbine auxiliary power units for aircraft, can cause damage to nearby aircraft surfaces, equipment, personnel, and ground surface materials such as asphalt. When aircraft APUs are run while on the ground, exhaust gases from APUs create hazardous areas that must be avoided by personnel as they compete for space with support equipment to service the aircraft. Increasing demand for electric power on commercial and military aircraft, and space constraints for incorporating on-board power generators, are only a few of the challenges faced by designers. Heat shields of more-or-less exotic heat-resistant materials are known for use in protecting nearby aircraft surfaces from damage, but these add unwanted weight to an aircraft, and cannot practically be applied to ground surfaces, equipment, and personnel.

SUMMARY

An exhaust plume cooling device is provided for cooling an exhaust gas plume to reduce deleterious heat effects on impinged and surrounding surfaces. The device comprises an injector supportable in a position adjacent an exhaust nozzle of an engine and aimed into an exhaust plume zone that is occupied by an exhaust plume when the engine is running, and a flow generator that is connected to and in fluid communication with the injector and generates and periodically transmits fluid flow through the injector into the exhaust plume zone at a rate and duty cycle that forms exhaust gas pulses that form vortical structures that entrain currents of ambient air.

Also, a method is provided for cooling an exhaust gas plume to reduce deleterious heat effects on impinged and surrounding surfaces. The method includes periodically interrupting a flow of exhaust gases by injecting fluid into the exhaust plume zone at a rate and duty cycle that forms exhaust gas pulses that form vortical structures that entrain currents of ambient air.

DRAWING DESCRIPTIONS

These and other features and advantages will become apparent to those skilled in the art in connection with the following detailed description and drawings of one or more embodiments of the invention, in which.

DETAILED DESCRIPTION

Figures 1, 2:
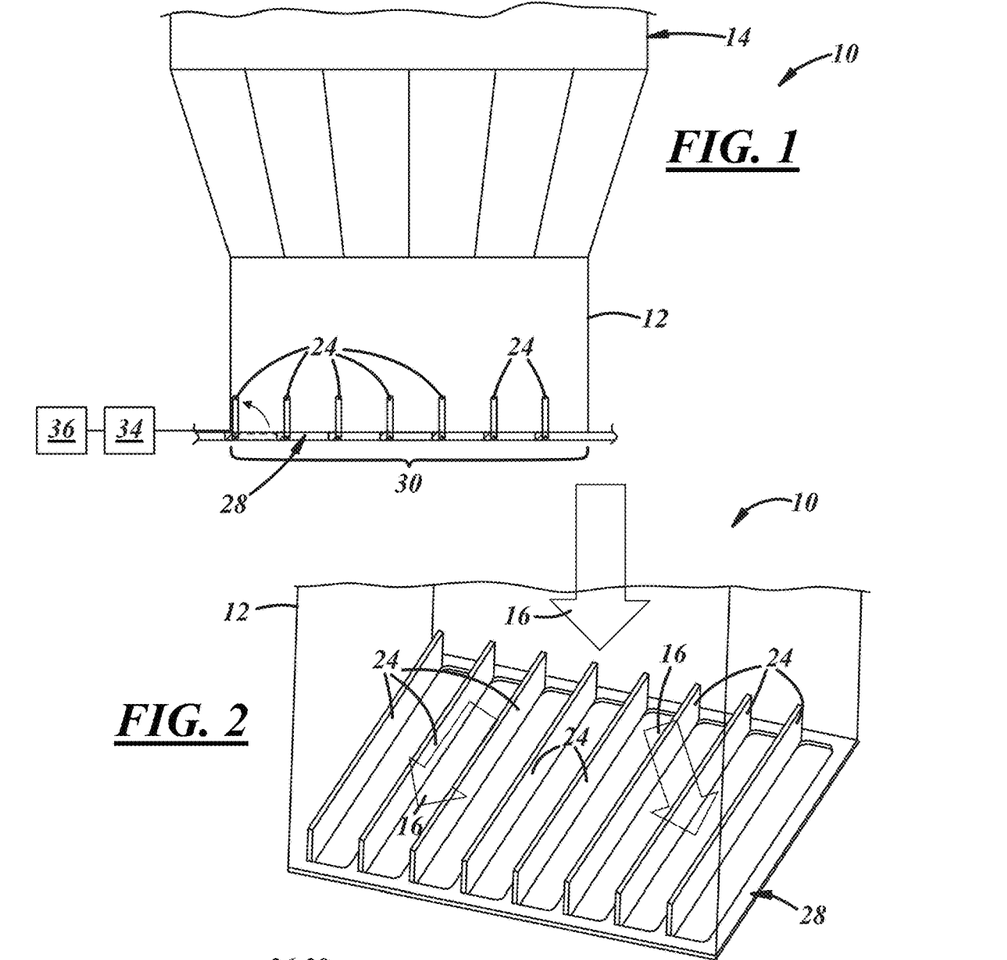
FIG. 1 is a schematic cross-sectional side view of an exhaust nozzle and an exhaust plume cooling device comprising a louvered vent mounted across an exit plane of the exhaust nozzle.
FIG. 2 is a schematic fragmentary orthogonal view of the nozzle and louvered vent of FIG. 1.
Figure 3:
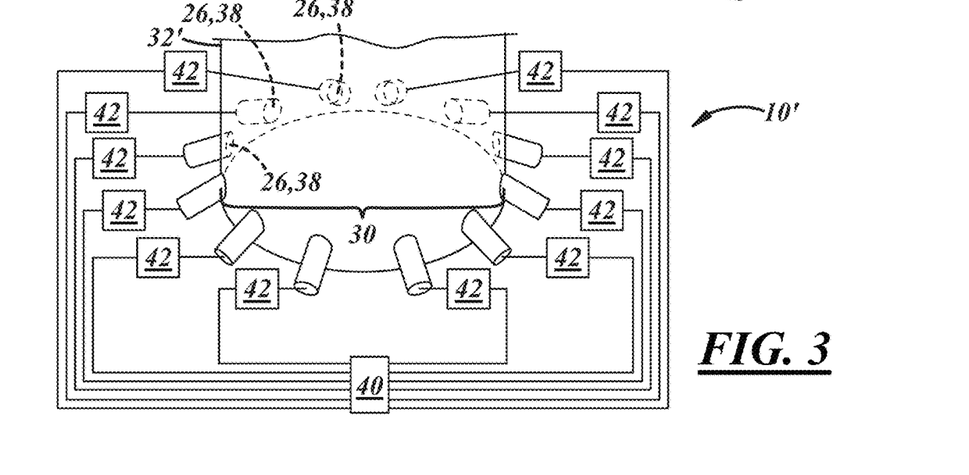
FIG. 3 is a schematic perspective view of an exhaust nozzle and a second embodiment of an exhaust plume cooling device including an array of fluid injectors positioned to direct fluid into the nozzle.

A first illustrative embodiment of a device for cooling an exhaust gas plume to reduce deleterious heat effects on impinged and surrounding surfaces is generally shown at 10 in FIGS. 1 and 2. FIG. 3 shows a second illustrative embodiment, similar in many respects to the embodiment of FIGS. 1 and 2, and like numerals between the embodiments generally designate like or corresponding elements throughout the several views of the drawing figures. Additionally, the descriptions of the embodiments are incorporated by reference into one another and the common subject matter generally may not be repeated.

Figure 4:
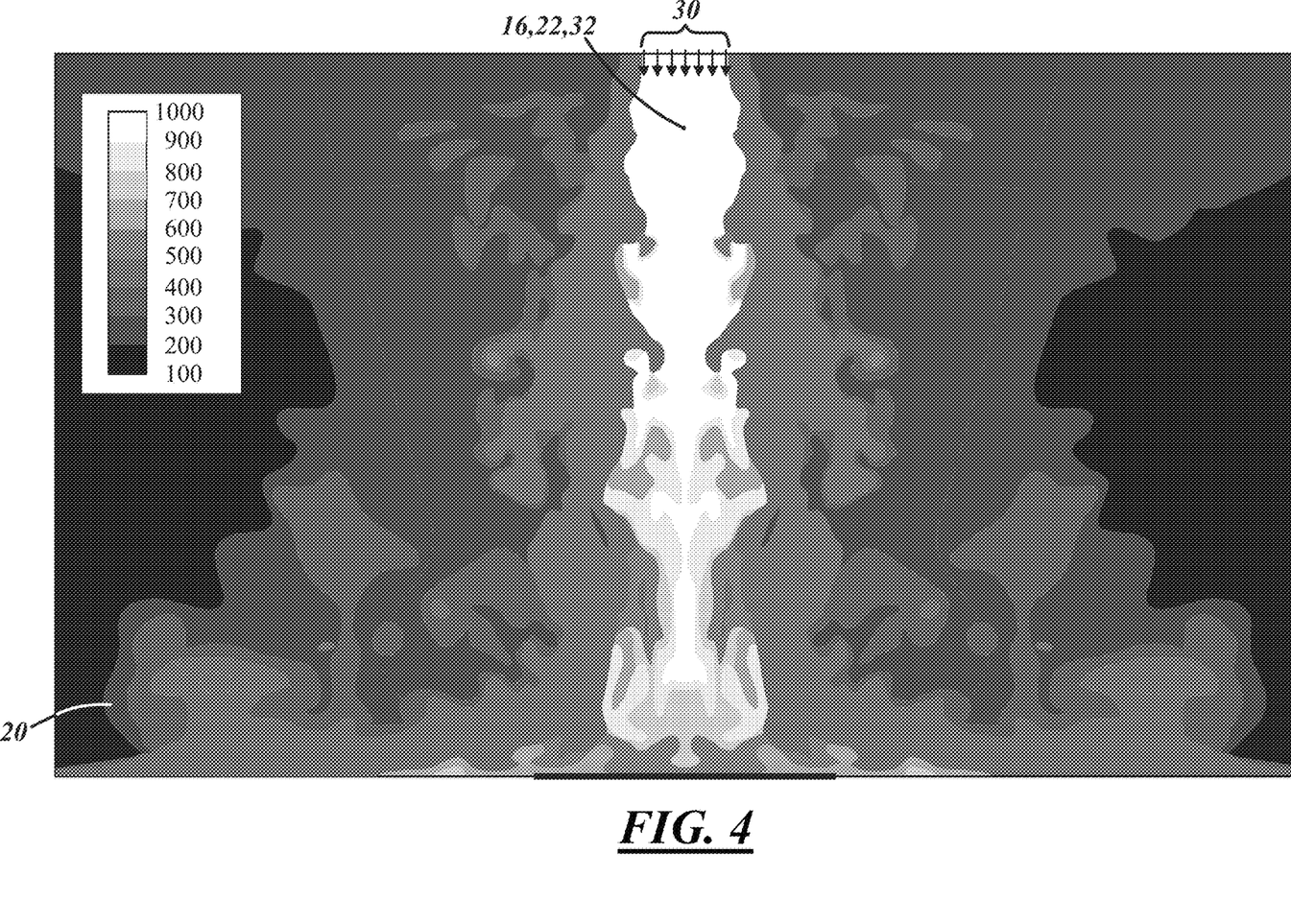
FIG. 4 is an image of temperature contours for an un-interrupted (baseline) plume of exhaust gases, with lighter colors indicating higher temperature.
Figure 5:
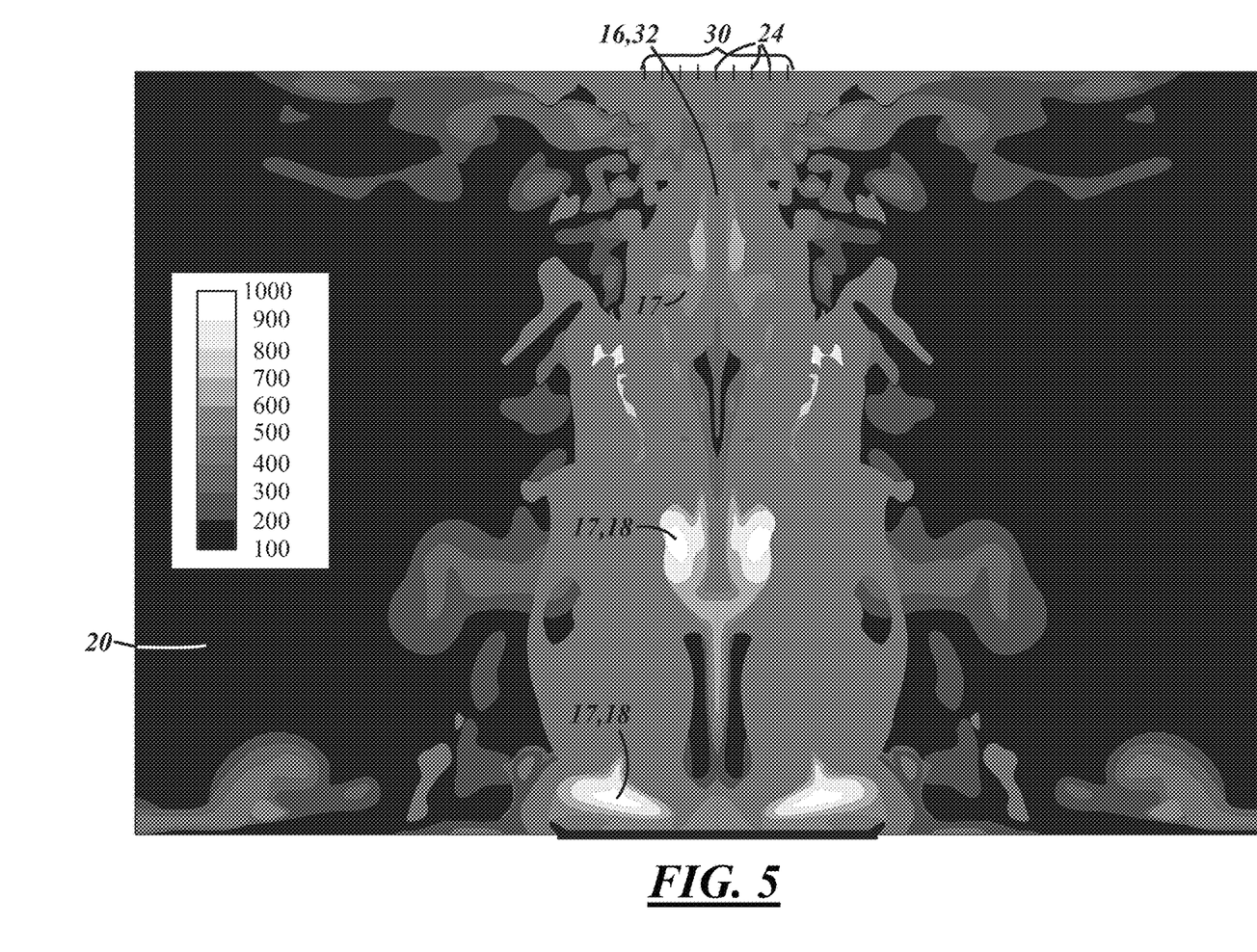
FIG. 5 is an image of temperature contours for a plume of exhaust gases interrupted (pulsed) by the device of FIG. 1, with lighter colors indicating higher temperature.
Figure 6:
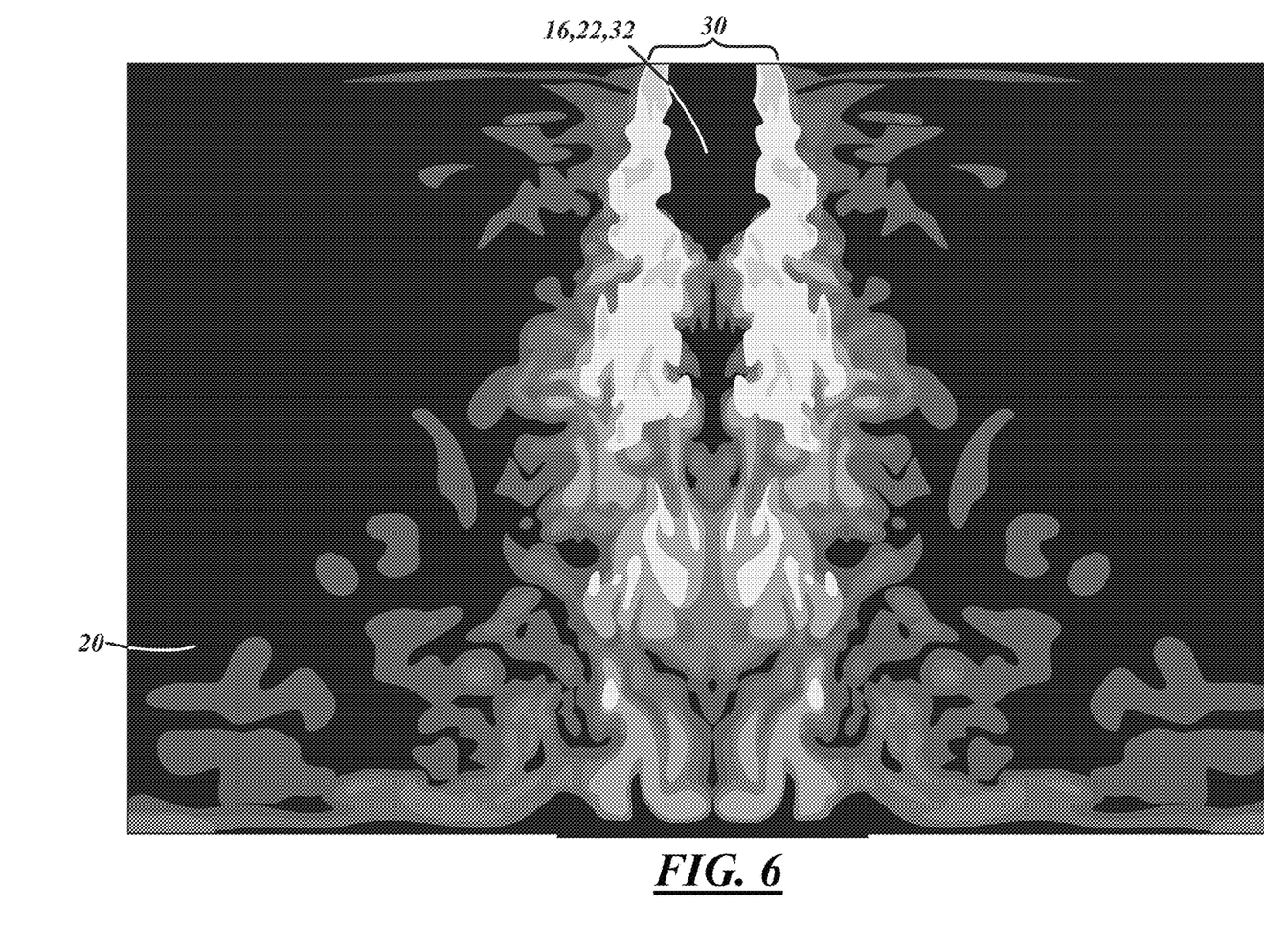
FIG. 6 is an image of vorticity contours of the un-interrupted plume of FIG. 4, with lighter colors indicating greater vorticity (high vorticity indicates greater mixing of the plume with the surrounding air)
Figure 7:
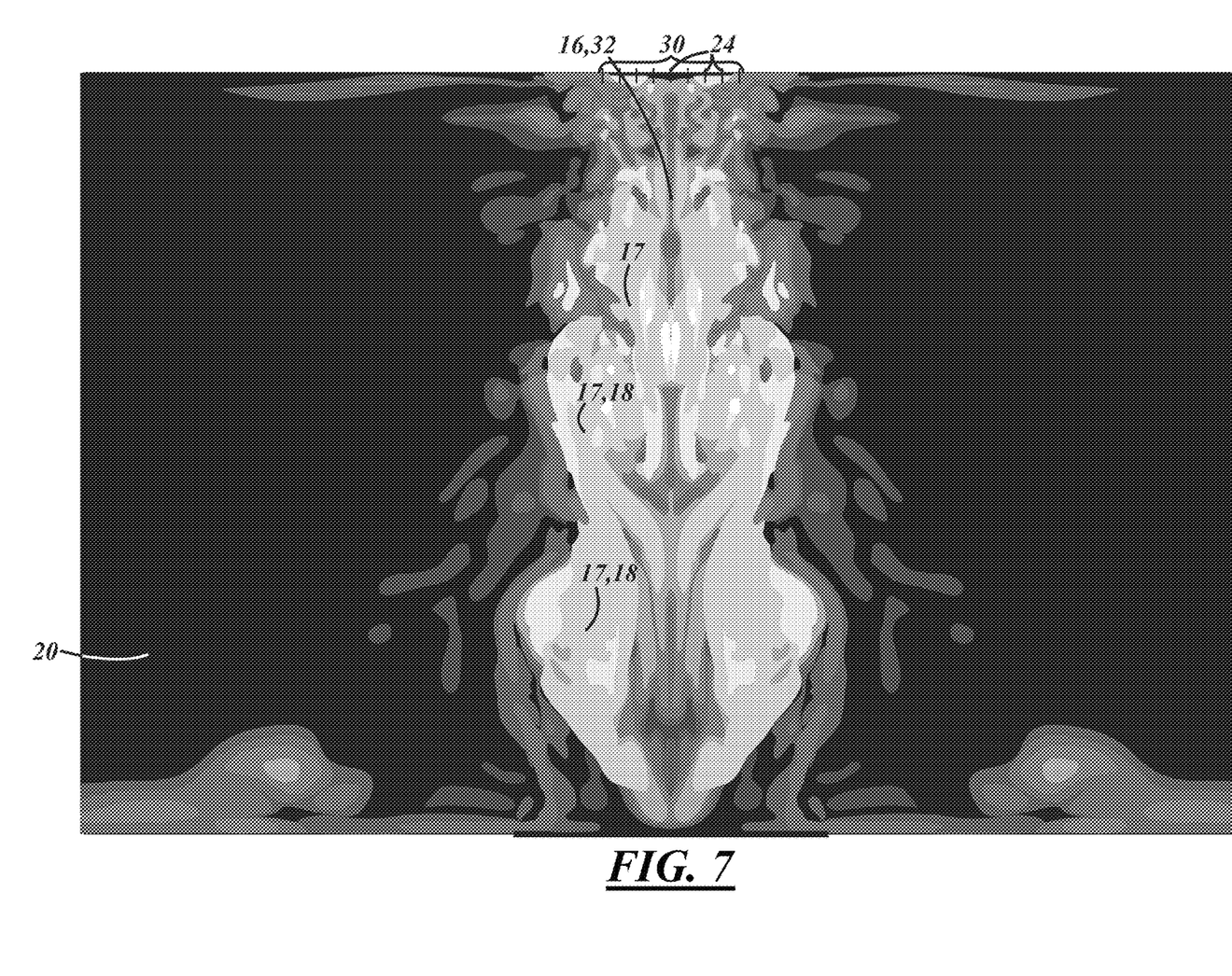
FIG. 7 is an image of vorticity contours of the interrupted plume of FIG. 5, with lighter colors indicating greater vorticity.
Figure 8:
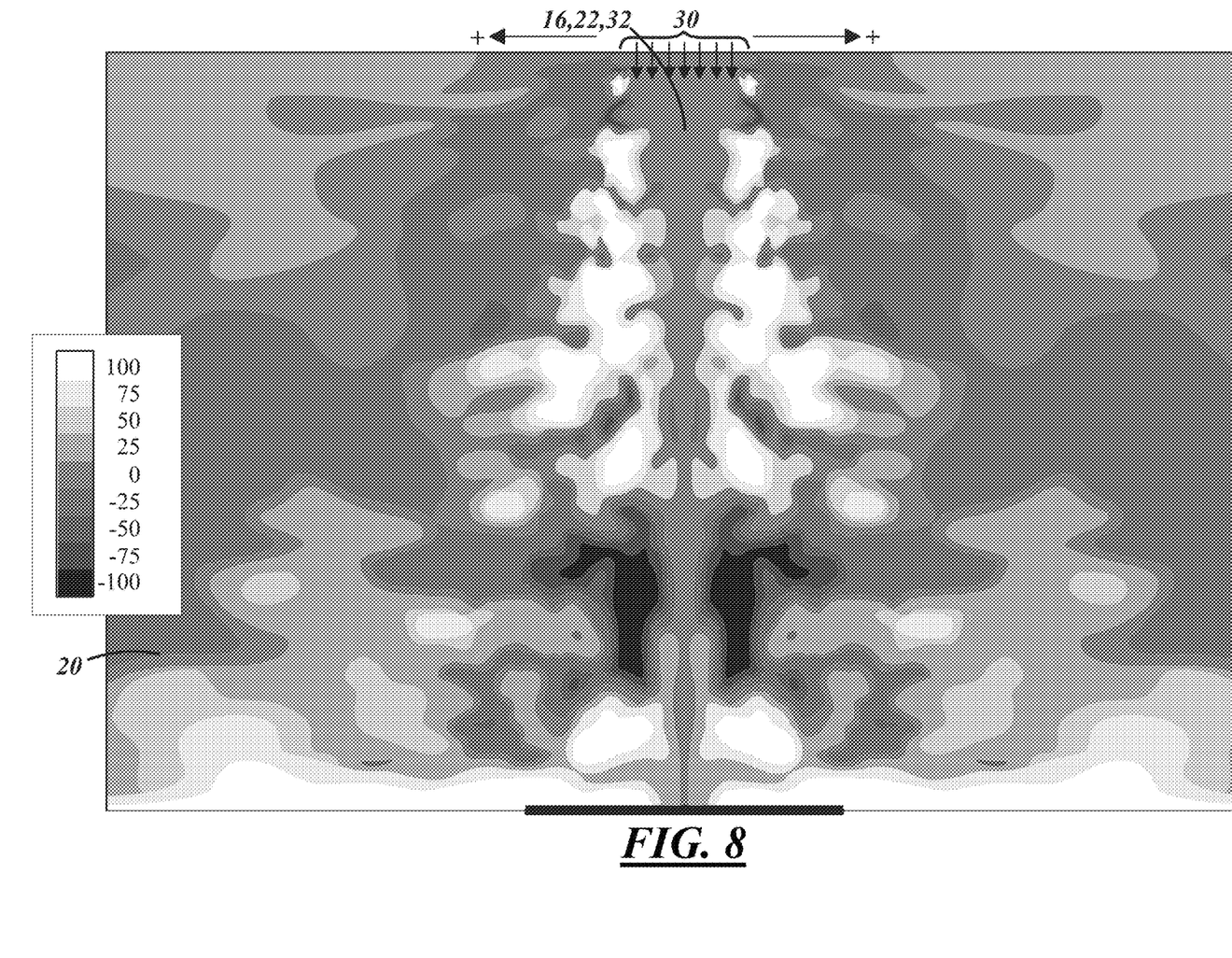
FIG. 8 is an image of contours of radial velocity (horizontal velocity directed away from the plume axis) for the un-interrupted plume of FIG. 4, with lighter colors indicating faster outward flow.
Figure 9:
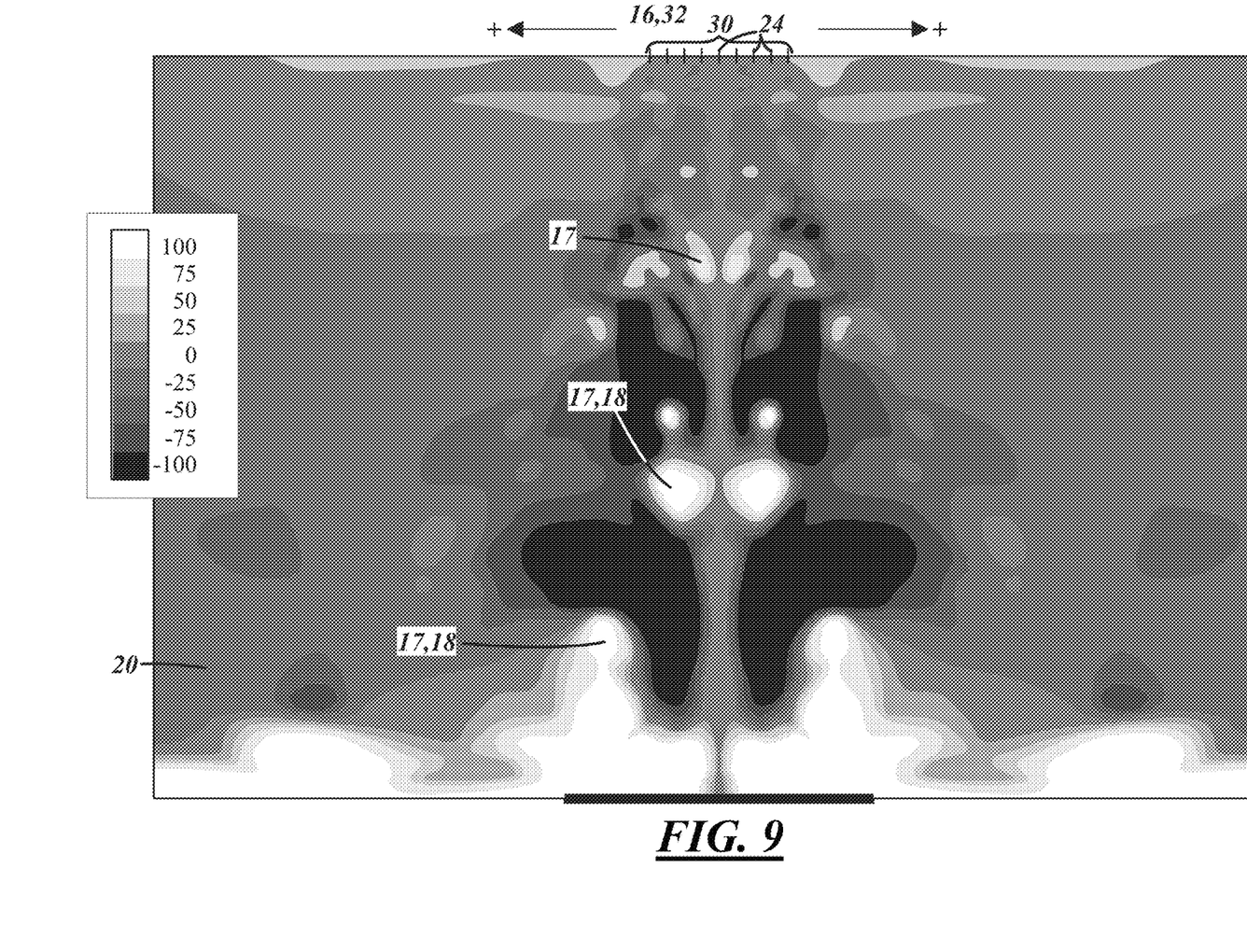
FIG. 9 is an image of contours of radial velocity for the interrupted plume of FIG. 5 with lighter colors indicating faster outward flow.

As shown in FIGS. 1 and 2, the device 10 may be supported in a downstream position within an exhaust nozzle 12 of an exhaust gas plume-producing engine 14 such as a jet turbine engine of an auxiliary power unit (APU). The device 10 may be configured to periodically interrupt (and may completely block the flow of) exhaust gases 16 such that exhaust gas pulses 17 form, creating vortical structures 18 that entrain large currents of the ambient air 20 to quickly cool the exhaust gases 16, as shown in FIGS. 5, 7, and 9. In other words, the exhaust 16 is temporarily restricted from exiting the nozzle 12 by creating a cycling restriction on the hot low speed exhaust 16. During this restriction period, the pressure of the exhaust jet 16 upstream and downstream of the restriction respectively increases and decreases. The restriction is then removed, and the exhaust 16 proceeds along its original course into the ambient air 20. As best shown in FIGS. 5, 7, and 9, the resulting variation in exhaust flow dramatically enhances the mixing of the exhaust gases 16 with the ambient air 20, causing exhaust gas pulses 17 to cool much faster than would a steady exhaust plume 22 (as shown by the heat image in FIG. 4). With proper timing of the restriction cycle, large-scale vortical structures 18 (visible in FIGS. 7 and 9) may be created and optimized to entrain the surrounding cooler ambient air 20, as best shown in FIG. 9, causing the exhaust gas pulses 17 to cool much faster than the steady exhaust plume 22 (shown in FIGS. 4, 6, and 8), while preserving the same overall flow rate of the unmodified steady exhaust plume 22.

According to the first embodiment, and as shown in FIGS. 5, 7, and 9, the pulses 17 may be created by actuating an array of elongated mechanical louvers 24, while, according to the second embodiment, which is shown in FIG. 3, the pulses 17 may instead be created by a series of injectors 26. According to these embodiments, the louvers 24 or injectors 26 may preferably be operated at a rate of 50 Hz and a 50% duty cycle. They may, however, be operated in such a way as to periodically interrupt the flow of exhaust gases 16 at any suitable rate between approximately 1 and 1000 Hz and at any suitable duty cycle between approximately 10 and 90%. The optimum frequency is roughly proportional to the plume exit velocity for low speed flow (when compressibility effects are small). Because "low speed flow" encompasses a range of velocities between zero and hundreds of feet per second, the optimum frequency can vary substantially from one application to another. Along with exit speed, other important factors include the distance and orientation of the surface of interest, and cross flow velocity of ambient air. For an application with a hot plume exiting a nozzle at velocity of 100 feet per second, and directed toward a surface 5 feet away, the optimum actuation frequency is expected to be less than approximately 50 Hz. Ideal performance is expected if the area reduction happens instantly, and then the restoration to maximum area also happens instantly (i.e., a "shuttering" effect). The ratio of the minimum area to the overall cycle time is the "duty cycle." Duty cycles close to zero (i.e., effective area suddenly reduces to a minimum value and immediately increases again) would have minimum adverse effect on the hardware involved for power generation. However, duty cycles close to 100% (i.e., effective area suddenly increases to a maximum value before immediately decreasing again) would introduce larger mixing structures. Therefore, the optimum duty cycle may be affected by the power generator's ability to tolerate a range of back pressures.

According to the first embodiment, and as best shown in FIGS. 1 and 2, the device 10 may comprise a vent 28 supported across an exhaust plume zone 30 that is occupied by an exhaust plume 32 when the engine 14 is running. An actuator 34 may be operably connected to the vent 28 and configured to alternately open and close the vent 28, and a vent controller 36 may be configured to command the actuator 34 to alternately open and close at a rate and at a duty cycle that forms exhaust gas pulses 17 configured to form vortical structures 18 that entrain currents of ambient air 20.

The vent 28 may comprise the array of louvers 24, and the louvers 24 may be operably connected to the actuator 34. The louvers 24 may be disposed parallel to and immediately adjacent one another and may be arrayed in a plane generally normal to a direction of exhaust gas flow. The louvers 24 may be simultaneously actuated to move between respective open and closed positions in response to commands from the vent controller 36.

According to the second embodiment, shown in FIG. 3, the injectors 26 may be supported in respective circumferentially-spaced positions 38 around and/or adjacent an exhaust nozzle 12 and aimed into an exhaust plume zone 30 that is occupied by an exhaust plume 32 when the engine 14 is running. A flow generator 40 (which may be, for example, an air bleed line from a turbine APU) may be connected to, and be in fluid communication with, each injector 26, and may be configured to generate and transmit fluid flow through the injectors 26 into the exhaust plume zone 30. A flow controller 42 may be connected to, and in fluid communication with, the flow generator 40 and each injector 26. The flow generators 42 may be configured to allow fluid to be periodically emitted through the injectors 26 and into the exhaust plume zone 30 at a rate and at a duty cycle that forms exhaust gas pulses 17 configured to form vortical structures 18 that entrain currents of ambient air 20. In this embodiment, the injectors 26 are aimed radially inward into the exhaust plume zone 30, and aimed upstream at an elevation angle in the range of −45 to +45 degrees as measured upstream from a plane parallel to an exit plane of the exhaust nozzle 12. In other embodiments, however, any number, formation, orientation, or configuration of injectors 26 may be used.

In practice, an exhaust gas plume 32 may be cooled by periodically interrupting a flow of exhaust gases 16 at a rate and over a duty cycle sufficient to cause resulting exhaust gas pulses 17 to form vortical structures 18 that entrain large currents of the ambient air 20. According to the first embodiment, the vent 28 may be supported across the exhaust plume zone 30 and exhaust plume 32 when the engine 14 is running. The vent 28 may then be opened and closed at a rate and duty cycle that forms exhaust gas pulses 17 configured to form vortical structures 18 that entrain currents of ambient air 20.

According to the second embodiment, fluid may be injected into the exhaust plume zone 30 at a rate and at a duty cycle that forms exhaust gas pulses 17 configured to form vortical structures 18 that entrain currents of ambient air 20. The fluid may be injected radially inward into the exhaust plume zone 30 from circumferentially-spaced positions 38, shown in FIG. 3, around the exhaust plume zone 30.

A device constructed and employed as described above greatly improves mixing based cooling of an exhaust plume, reducing potential damage to the aircraft skin, and nearby personnel and equipment without adding significant weight to, or occupying significant space on an aircraft. The device and method may also allow heavy heat shields to be removed from retrofitted aircraft, potentially resulting in a net weight savings.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An exhaust plume cooling device for cooling an exhaust gas plume to reduce deleterious heat effects on impinged and surrounding surfaces, the device comprising:

an injector supportable in a position adjacent an exhaust nozzle of an engine and aimed into an exhaust plume zone that is occupied by an exhaust plume when the engine is running, the injector being aimed upstream relative to the flow of the exhaust plume; and a flow generator that is connected to and in fluid communication with the injector and generates and periodically transmits fluid flow through the injector into the exhaust plume zone at a rate and duty cycle that forms exhaust gas pulses that form vortical structures that entrain currents of ambient air.

2. An exhaust plume cooling device for cooling an exhaust gas plume to reduce deleterious heat effects on impinged and surrounding surfaces, the device comprising:
- a plurality of injectors supportable in respective circumferentially-spaced positions around an exhaust nozzle of an engine and aimed into an exhaust plume zone that is occupied by an exhaust plume when the engine is running, the injectors being aimed upstream relative to the flow of the exhaust plume; and
- a flow generator that is connected to and in fluid communication with each injector of the plurality of injectors and generates and transmits fluid flow through the injectors into the exhaust plume zone; and
- a flow controller that is connected to and is in fluid communication with the flow generator and each injector of the plurality of injectors, and periodically and simultaneously causes fluid to be emitted through the injectors into the exhaust plume zone at a rate and at a duty cycle that forms exhaust gas pulses that form vortical structures that entrain currents of ambient air.

3. The exhaust plume cooling device as defined in claim 2 in which the injectors are aimed radially inward into the exhaust plume zone.

4. The exhaust plume cooling device as defined in claim 3 in which each of the injectors is aimed upstream at an elevation angle in the range of −45 to +45 degrees as measured upstream from a plane parallel to an exit plane of the exhaust nozzle.

5. A method for cooling an exhaust gas plume to reduce deleterious heat effects on impinged and surrounding surfaces by periodically interrupting a flow of exhaust gases by injecting fluid into an exhaust plume zone that is occupied by an exhaust plume of an engine when the engine is running, such that the injected fluid restricts the flow of exhaust gases at a rate and duty cycle that forms exhaust gas pulses that form vortical structures that entrain currents of ambient air wherein the step of injecting fluid into the exhaust plume zone includes injecting fluid in an upstream direction, relative to the flow of the exhaust plume, from circumferentially-spaced positions around the exhaust plume zone.

6. The method of claim 5 in which the step of injecting fluid into the exhaust plume zone includes injecting fluid radially inward into the exhaust plume zone from the circumferentially-spaced positions around the exhaust plume zone.

7. The method of claim 6 in which the step of injecting fluid into the exhaust plume zone includes injecting fluid upstream, relative to the flow of the exhaust plume, from the circumferentially-spaced positions at respective elevation angles in the range of −45 to +45 degrees as measured upstream from a plane parallel to an exit plane of an exhaust nozzle from which the plume is emitted.

* * * * *